W. H. LASATER.
SCREW.
APPLICATION FILED SEPT. 20, 1912.

1,084,643.

Patented Jan. 20, 1914.

Witnesses

W. H. Lasater,
Inventor
by C. A. Snow & Co.
Attorneys

UNITED STATES PATENT OFFICE.

WILLIAM HERBERT LASATER, OF ASHEVILLE, NORTH CAROLINA.

SCREW.

1,084,643.

Specification of Letters Patent.

Patented Jan. 20, 1914.

Application filed September 20, 1912. Serial No. 721,502.

*To all whom it may concern:*

Be it known that I, WILLIAM H. LASATER, a citizen of the United States, residing at Asheville, in the county of Buncombe and State of North Carolina, have invented a new and useful Screw, of which the following is a specification.

This invention relates to wood screws, and aims to provide a self-drilling and counter-sinking screw, which will eliminate the use of a drill bit and a counter-sinking bit.

To the above ends, the present screw has been provided with a cutting edge near its point extending from the outer convolution of its thread to the next convolution, and diagonally in the direction of the thread so that the said edge will bore a hole as the screw progresses into an object, the latter convolution being cut away in advance of the cutting edge to provide a passage for the chips and shavings so as to permit them to work outwardly along the threads. The screw is made self-counter sinking by providing a cutting edge projecting from the beveled side of the head and extending from the inner end of the head to the periphery thereof so that the said edge will cut away the wood as the head approaches the surface of the object for providing the counter-sunk recess for receiving the head.

The invention has been illustrated in the accompanying drawings, wherein—

Figure 1:
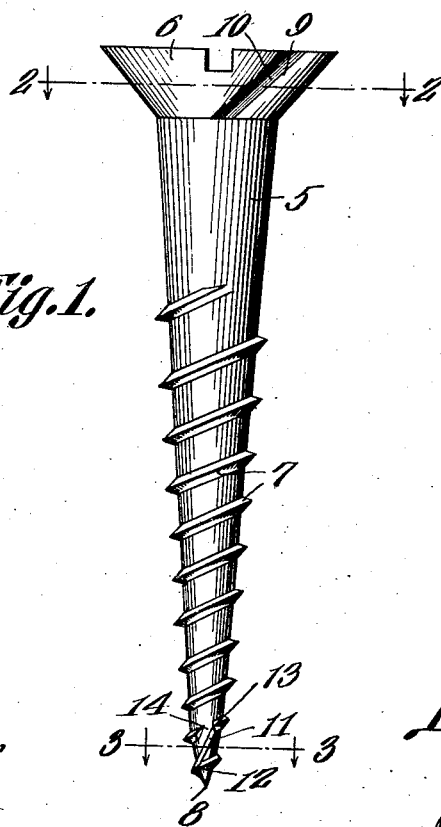
Figure 2:
Figure 3:
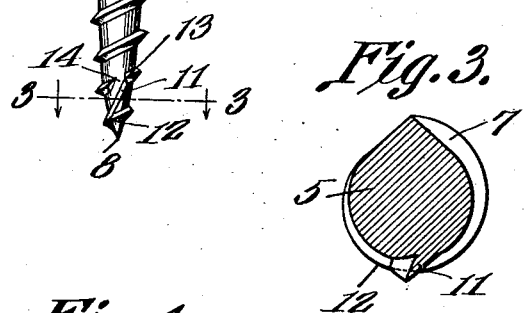
Figure 4:
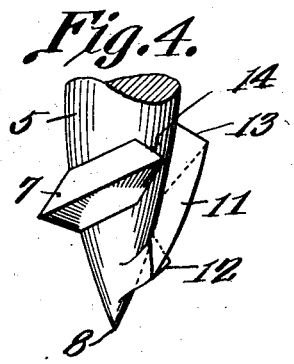

Figure 1 is an elevation of a screw constructed in accordance with the present invention. Fig. 2 is a sectional view taken on the line 2—2 of Fig. 1. Fig. 3 is an enlarged sectional view taken on the line 3—3 of Fig. 1. Fig. 4 is a fragmental view of the tip of the screw on an enlarged scale.

Referring specifically to the drawings the screw 5 is of the ordinary wood screw type, having the counter-sunk head 6, the screw thread 7, and the tip 8. The blade or cutting edge 9 is struck outwardly from the periphery of the beveled side of the head 6 and extends diagonally from the inner end to the periphery of the head. Said cutting edge 9 is of approximate equal width throughout and is under cut to provide a groove or channel 10 which opens upwardly, the cutting edge 9 projecting in such a direction that it will move forwardly as the screw works into an object. An undercut cutting edge or blade 11 at the point of the screw extends from the outer convolution 12 of the thread 7 of the screw to the next convolution 13 and diagonally in the direction of the thread, the said cutting edge being struck outwardly from the body or shank of the screw or being otherwise fashioned and connecting the said convolutions integrally from their roots to their ridges. The convolution 13 is cut away in advance of the cutting edge 11 flush with the cutting edge and shank of the screw so as to provide an opening or passage 14 leading to the space between the convolution 13 and the next convolution. Thus, with the provision of the cutting edges 11 and 9, the screw is rendered self-boring and self-countersinking with merely the use of the ordinary screw driver or other implement for driving the screw home. As the screw takes into the object, the cutting edge 11 will bore out the hole in order to permit the screw to advance into the object, the chips and shavings formed by the cutting edge 11 passing through the opening 14 and working outwardly between the convolutions of the thread 7. Then, as the head of the screw approaches the object, the cutting edge 9 will ream out the object so as to provide a counter-sunk recess for receiving the head of the screw, the chips and shavings advancing outwardy along the groove 10.

Particular attention is directed to the fact that the ends of the cutting blade or cutting edge 9 terminate in the planes of the face and base of the head 6, the inner end of the blades 9 being free, so as to serve as a drill to cut into the wood in advance of the cutting edge proper for enlarging the screw bore, while the cutting edge proper serves to ream out the enlarged portion of the bore into a countersunk socket for the head of the screw. The basal edge of the blade 9 is attached to the head of the screw, while its ends are free, in order that the cutting edge of the blade 9 may serve the double function, as indicated.

From the foregoing, taken in connection with the drawings, the advantages and features of the present device will be apparent, it being noted that the cutters 11 and 9 may be provided at such a small cost as not to impair the use of the present screw in place of the ordinary one.

Having thus described the invention what is claimed as new is:—

1. A wood screw including a counter sunk head having a diagonal undercut cutting blade projecting outwardly from its beveled side and of approximate equal width throughout, the ends of the blade terminating in the planes of the face and base of the head, the inner end of the blade being free, so as to serve as a drill to cut into the wood in advance of the cutting edge for enlarging the screw bore, the cutting edge serving to ream out the enlarged portion of the bore into a countersunk socket for the head.

2. A wood screw having a diagonal cutting blade projecting from its body and connecting two outer thread convolutions, the innermost of the said convolutions being cut away in advance of the blade flush with the blade and body of the screw.

In testimony that I claim the foregoing as my own, I have hereto affixed my signature in the presence of two witnesses.

WILLIAM HERBERT LASATER.

Witnesses:
JOHN H. SELLERS,
W. C. TEMPLETON.